(12) United States Patent  
Wang et al.

(10) Patent No.: US 9,511,696 B2
(45) Date of Patent: Dec. 6, 2016

(54) ROTATABLE HEADREST ASSEMBLY

(71) Applicant: DAIMAY NORTH AMERICA AUTOMOTIVE, INC., Redford, MI (US)

(72) Inventors: Jianhua Wang, Novi, MI (US); Yingtai Jiang, Shanghai (CN); Xiaoguang Wang, Windsor (CA)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 28 days.

(21) Appl. No.: 14/705,282

(22) Filed: May 6, 2015

(65) Prior Publication Data

US 2016/0325651 A1    Nov. 10, 2016

(51) Int. Cl.
*B60N 2/48* (2006.01)
*B60N 2/64* (2006.01)

(52) U.S. Cl.
CPC ........... *B60N 2/4838* (2013.01); *B60N 2/4808* (2013.01); *B60N 2/64* (2013.01)

(58) Field of Classification Search
CPC ... B60N 2/4838; B60N 2/4808; B60N 2/4847; B60N 2/64; A47C 7/38
USPC ........................................................ 297/408
See application file for complete search history.

(56) References Cited

U.S. PATENT DOCUMENTS 2,652,101 A     9/1953  Samsky et al.
3,948,562 A *   4/1976  Grabner ............... B60N 2/4838
                                                              297/408
4,840,428 A     6/1989  Kobayashi et al.
5,683,141 A *  11/1997  Wakamatsu ........... B60N 2/485
                                                              297/396
6,511,130 B2    1/2003  Dinkel et al.
(Continued)

FOREIGN PATENT DOCUMENTS

CN      1194616 A     9/1998
CN      1701001 A    11/2005
(Continued)

*Primary Examiner* — Milton Nelson, Jr.
(74) *Attorney, Agent, or Firm* — Carlson, Gaskey & Olds, P.C.

(57) ABSTRACT

This disclosure relates to a headrest assembly including, among other things, a rod configured to couple the headrest assembly to a seat back. The rod includes two vertical portions and a horizontal portion extending along a rotation axis between the two vertical portions. The horizontal portion includes a first flat surface and a second flat surface. The headrest assembly further includes a head restraint configured to rotate relative to the rod between a use position and an adjustment position. The headrest assembly further includes a clip having a first flat surface and a second flat surface. The clip is configured such that (1) when the head restraint is in the use position, the first flat surface of the clip is in direct contact with the first flat surface of the horizontal portion and the first flat surfaces of the clip and the horizontal portion lie in a first common plane. Further, the clip is configured such that (2) when the head restraint is in the adjustment position, the second flat surface of the clip is in direct contact with the second flat surface of the horizontal portion and the second flat surfaces of the clip and the horizontal portion lie in a second common plane.

20 Claims, 9 Drawing Sheets

(56) References Cited

U.S. PATENT DOCUMENTS

| | | |
|---|---|---|
| 6,779,839 B2 | 8/2004 | Andreasson et al. |
| 7,108,320 B2 | 9/2006 | Schäfer et al. |
| 7,559,608 B2 | 7/2009 | Miyahara et al. |
| 7,967,375 B2 | 6/2011 | Yu et al. |
| 8,322,790 B2 | 12/2012 | Tscherbner |
| 8,851,562 B2 | 10/2014 | Rezbarik et al. |
| 8,939,513 B2 | 1/2015 | Holmes et al. |
| 2003/0178878 A1 | 9/2003 | Hoshihara et al. |
| 2004/0036340 A1* | 2/2004 | Imayou ............... B60N 2/4847 297/408 |
| 2005/0168038 A1 | 8/2005 | Kubo |
| 2007/0241593 A1 | 10/2007 | Woerner |
| 2008/0211267 A1 | 9/2008 | Linardi et al. |
| 2011/0057495 A1 | 3/2011 | Buccinna |

FOREIGN PATENT DOCUMENTS

| | | |
|---|---|---|
| CN | 101204935 A | 6/2008 |
| DE | 102005009646 A1 | 9/2006 |
| DE | 50305844 D1 | 1/2007 |
| DE | 102005046876 A1 | 4/2007 |
| DE | 60213722 T2 | 8/2007 |
| DE | 202005021378 U1 | 12/2007 |
| DE | 102007032767 A1 | 3/2008 |
| DE | 102007061938 A1 | 7/2008 |
| DE | 102008036644 A1 | 4/2009 |
| DE | 102007061938 B4 | 11/2009 |
| FR | 2792265 A1 | 10/2000 |
| FR | 2863221 B1 | 2/2006 |
| FR | 2881088 A1 | 7/2006 |
| FR | 2856257 B1 | 9/2006 |
| FR | 2898308 A1 | 9/2007 |
| FR | 2898308 B1 | 4/2008 |
| FR | 2910401 A1 | 6/2008 |
| JP | 08332880 A | 12/1996 |
| JP | 2597547 Y2 | 7/1999 |
| JP | 11290154 A | 10/1999 |
| JP | 2001061590 A | 3/2001 |
| JP | 2001204577 A | 7/2001 |
| JP | 2001211958 A | 8/2001 |
| JP | 2002010868 A | 1/2002 |
| JP | 2003116661 A | 4/2003 |
| JP | 2004155269 A | 6/2004 |
| JP | 2004229969 A | 8/2004 |
| JP | 2005065836 A | 3/2005 |
| JP | 2005124796 A | 5/2005 |
| JP | 2006306251 A | 11/2006 |
| JP | 2007082616 A | 4/2007 |
| JP | 2007082836 A | 4/2007 |
| JP | 2007082837 A | 4/2007 |
| JP | 2007083918 A | 4/2007 |
| JP | 2007145276 A | 6/2007 |
| JP | 2007202988 A | 8/2007 |
| JP | 2007330577 A | 12/2007 |
| JP | 4066785 B2 | 3/2008 |
| JP | 2008143498 A | 6/2008 |
| JP | 2009035115 A | 2/2009 |
| JP | 4254421 B2 | 4/2009 |
| JP | 2009119013 A | 6/2009 |
| JP | 4376705 B2 | 12/2009 |
| JP | 4517295 B2 | 8/2010 |
| JP | 4560731 B2 | 10/2010 |
| JP | 2010254104 A | 11/2010 |
| JP | 5076712 B2 | 11/2012 |
| JP | 5099492 B2 | 12/2012 |
| JP | 5366116 B2 | 12/2013 |
| JP | 5562620 B2 | 7/2014 |
| JP | 2014162256 A | 9/2014 |
| WO | 2007112002 A4 | 12/2007 |
| WO | 2008081317 A2 | 7/2008 |
| WO | 2008081317 A3 | 8/2008 |
| WO | 2009043996 A2 | 4/2009 |

* cited by examiner

ROTATABLE HEADREST ASSEMBLY

BACKGROUND

Many vehicle headrests, in particular those for rear seats, have head restraints resembling an inverted L-shape. When the headrest is in a lowered position relative to a seatback, the head restraint takes up a relatively small amount of vertical cabin space, which is helpful when folding the seatback for storage. When in a raised position, several known head restraints are configured to rotate, relative to a support rod, away from an occupant space and toward the support rod. This rotation provides a comfortable seating arrangement for an occupant.

Several known headrest assemblies, such as that described in JP2004155269, include a biasing element, such as a spring, configured to urge rotation of the head restraint as the head restraint moves from the lowered position to the raised position. In these arrangements, the head restraint essentially automatically rotates away from the occupant space under the biasing force of the spring element. Other headrest assemblies, such as that disclosed in FR2856257, allow for rotation of a head restraint relative to a rod by way of a clip. In that arrangement, the clip is compressed against the rod by way of a fastening element. The head restraint is allowed to rotate relative to the rod under the resilience of the clip.

SUMMARY

This disclosure relates to a headrest assembly including, among other things, a rod configured to couple the headrest assembly to a seat back. The rod includes two vertical portions and a horizontal portion extending along a rotation axis between the two vertical portions. The horizontal portion includes a first flat surface and a second flat surface. The headrest assembly further includes a head restraint configured to rotate relative to the rod between a use position and an adjustment position. The headrest assembly further includes a clip having a first flat surface and a second flat surface. The clip is configured such that (1) when the head restraint is in the use position, the first flat surface of the clip is in direct contact with the first flat surface of the horizontal portion and the first flat surfaces of the clip and the horizontal portion lie in a first common plane. Further, the clip is configured such that (2) when the head restraint is in the adjustment position, the second flat surface of the clip is in direct contact with the second flat surface of the horizontal portion and the second flat surfaces of the clip and the horizontal portion lie in a second common plane.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 5 illustrates a headrest relative to a seatback. In FIG. 5, the headrest is in a lowered position.

FIG. 7 illustrates a headrest relative to a seatback. In FIG. 7, the headrest is in the raised position.

DETAILED DESCRIPTION

Figure 1:
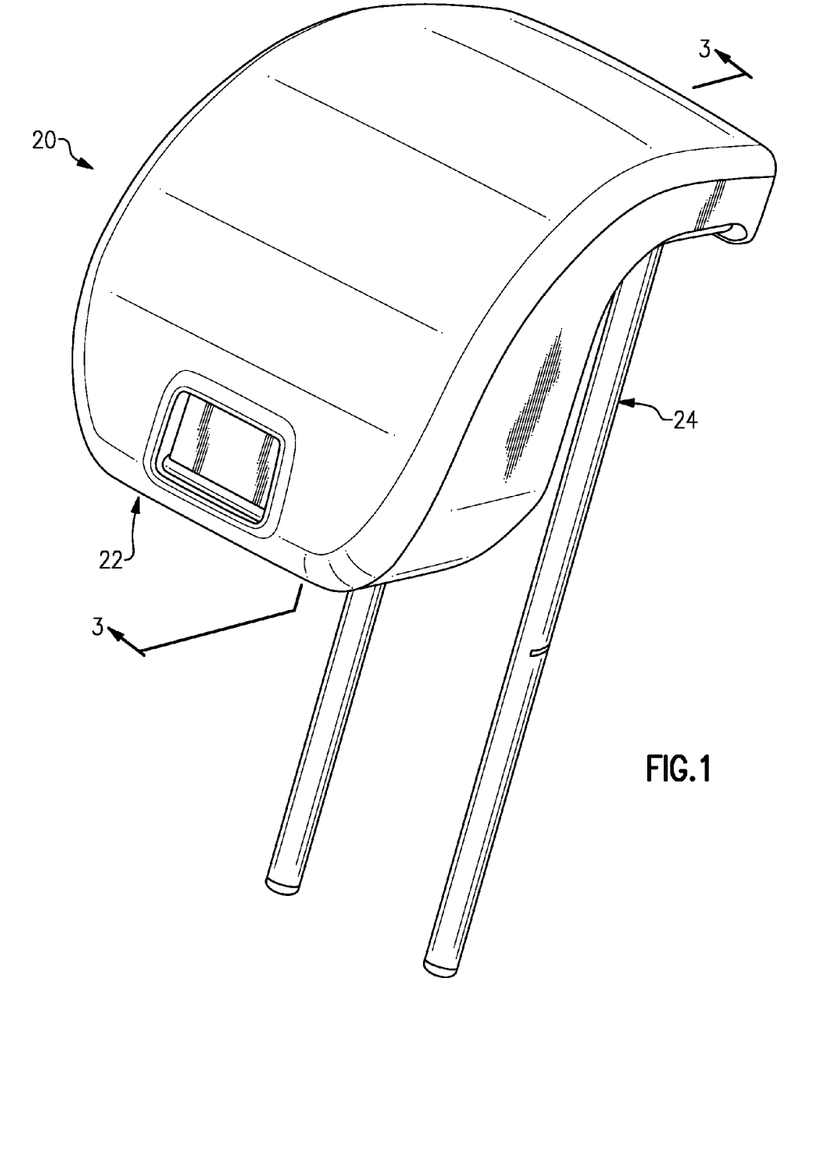
FIG. 1 illustrates a perspective view of an example headrest assembly.

FIG. 1 illustrates an example headrest assembly 20 according to this disclosure. The headrest assembly 20 includes a head restraint 22 and a rod 24 configured to couple the headrest assembly 20 to a seatback (see the seatback 82 in FIGS. 5-7).

Figure 2:
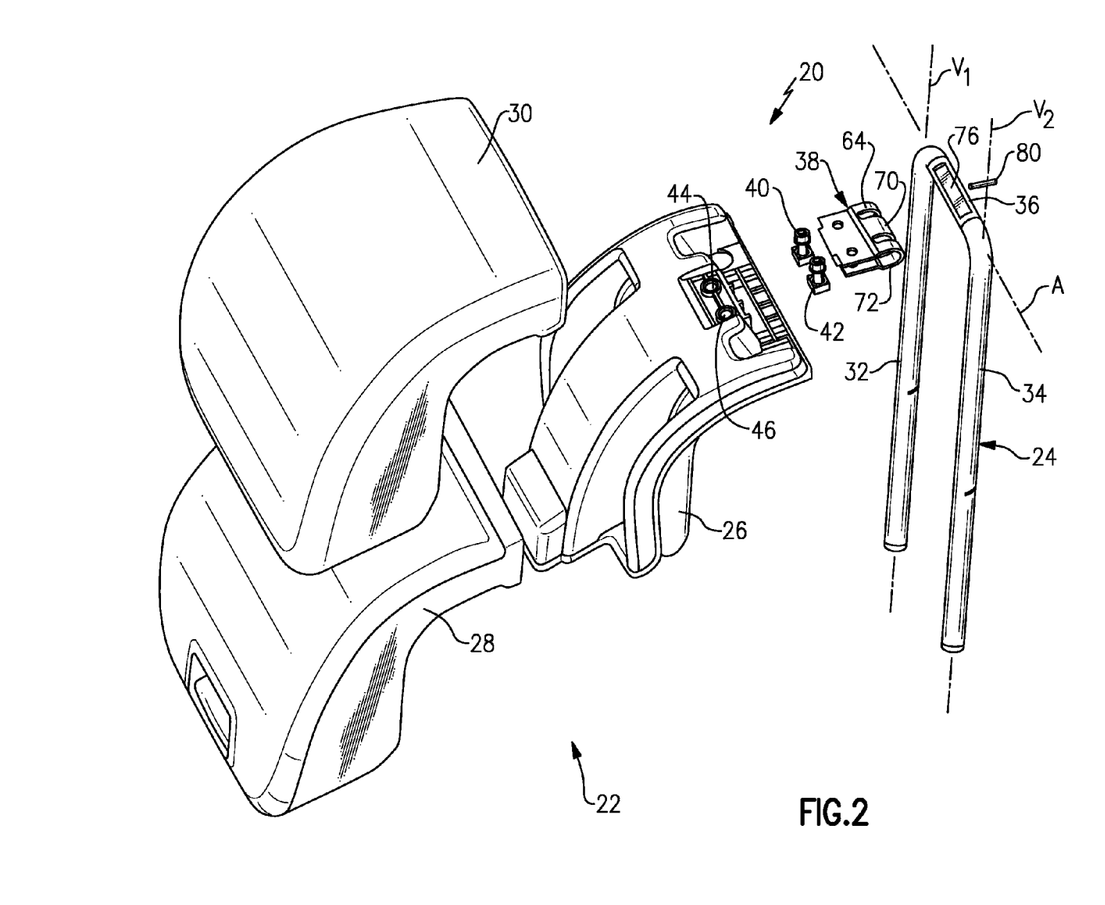
FIG. 2 is an exploded view of the headrest assembly of FIG. 1.

FIG. 2 is an exploded view of the headrest assembly 20 of FIG. 1. As shown in FIG. 2, the head restraint 22 includes a frame 26, a cushion support 28, and a cushion 30. The cushion 30 may include foam encased in fabric, such as leather or cloth.

The rod 24 includes first and second vertical portions 32, 34 arranged about respective first and second vertical axes $V_1$, $V_2$. The rod 24 further includes a horizontal portion 36 connecting the vertical portions 32, 34 at upper ends thereof. The horizontal portion 36 is disposed about a rotation axis A, which is substantially perpendicular to the vertical axes $V_1$, $V_2$. As will be discussed in detail below, the head restraint 22 is configured to rotate relative to the rod 24 about the rotation axis A.

Figure 3:
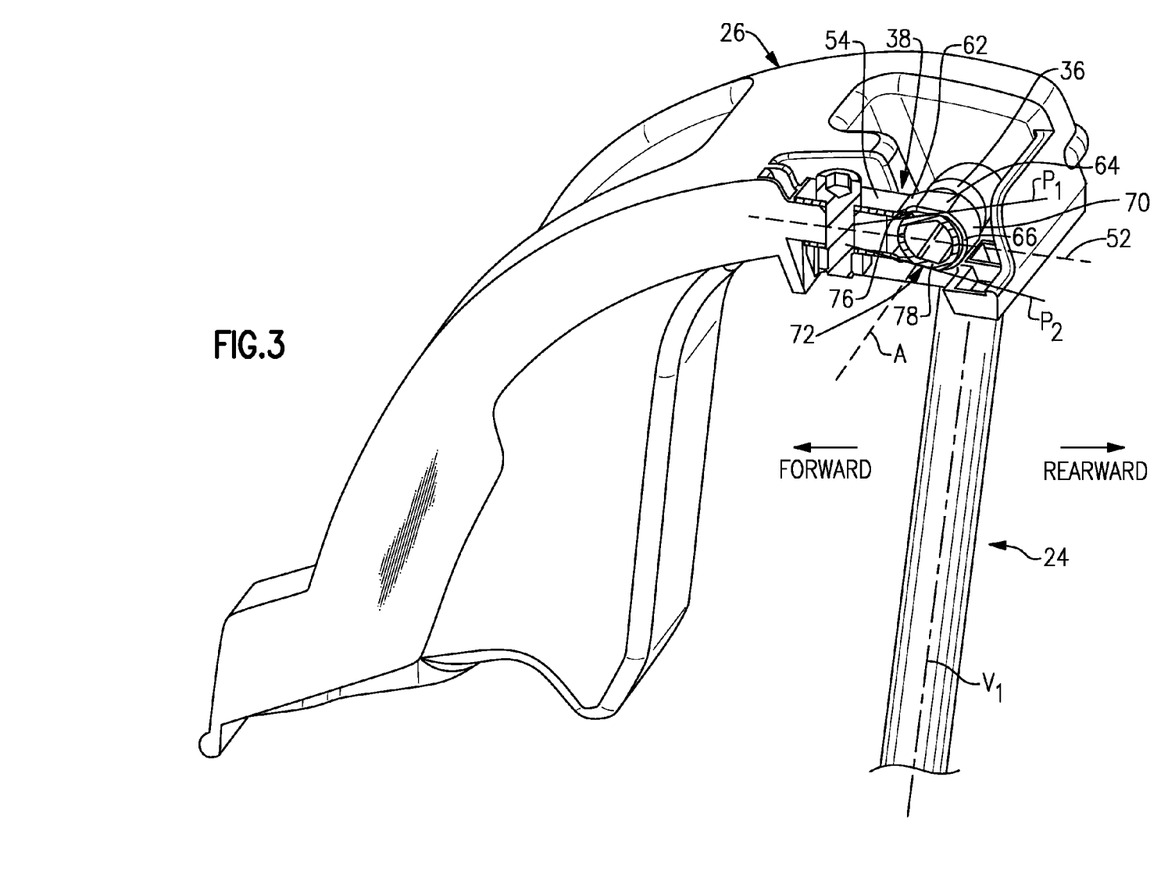
FIG. 3 is a cross-sectional view of the headrest assembly, taken along line 3-3 from FIG. 1.

In this disclosure, the head restraint 22 is coupled to rod 24 at the horizontal portion 36 by way of a clip 38. The clip 38 is configured to be fastened to the frame 26 by way of a plurality of fasteners 40, 42, which are configured to pass through corresponding orifices 44, 46 in the frame 26 and through the clip 38. FIG. 3 is a sectional view taken along line 3-3 from FIG. 1 and illustrates the arrangement of the frame 26, clip 38, and the rod 24.

Figure 4:
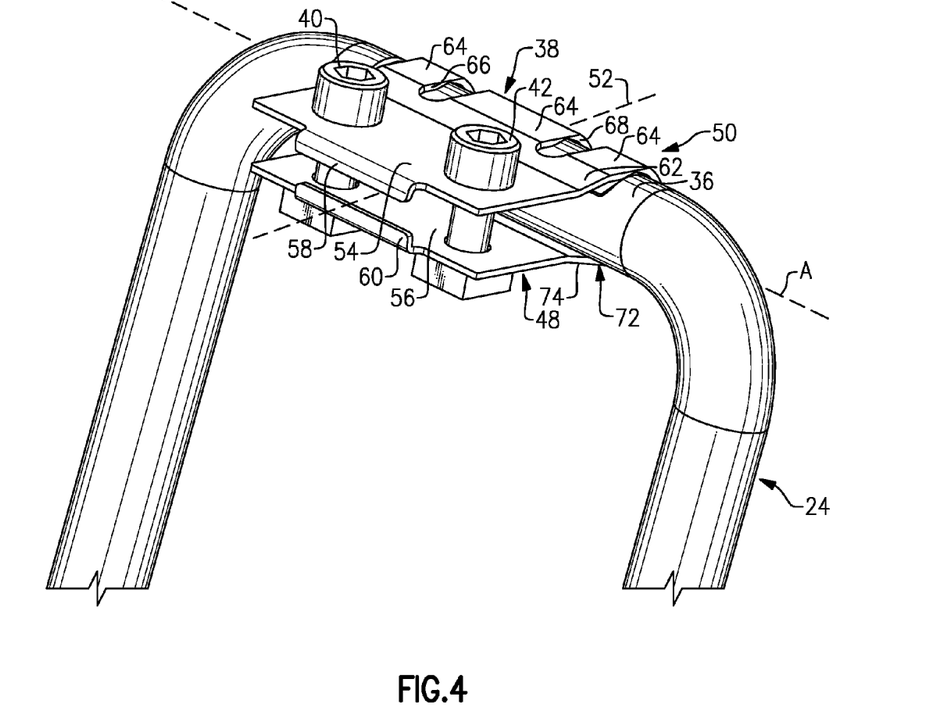
FIG. 4 is a perspective view of an arrangement of a clip relative to a rod.

FIG. 4 is a perspective view excluding the frame 26 and also illustrates the way the clip 38 is arranged relative to the rod 24. With joint reference to FIGS. 2-4, the clip 38 is generally U-shaped in cross-section (FIG. 3), and includes a connection portion 48 and a bearing portion 50. Further, the clip 38 is substantially symmetrical about a clip center axis 52, which bisects the clip 38 extends in a direction perpendicular to the rotation axis A.

In one example, the clip 38 is integrally formed of a single piece of material. The material may be a metallic material, such as steel, however this disclosure is not limited to any particular material type. Further, the clip 38 may be formed by any known manufacturing process, including stamping and bending.

The connection portion 48 of the clip 38 includes first and second fingers 54, 56. At a free end of each finger 54, 56, there are tabs 58, 60 for receipt in a corresponding slot in the frame 26 (see FIGS. 8A-8B). The fingers 54, 56 are generally planar, and include openings for receiving the fasteners 40, 42 therethrough. The fasteners 40, 42 connect the clip 38 to the frame 26 and also compress the clip 38 against the horizontal portion 36 of the rod 24.

Moving from the first finger 54, a topside of the clip 38 includes a first angled surface 62 connecting the first finger 54 and a first flat surface 64. The first flat surface 64 lies in a plane substantially parallel to a plane of the first finger 54 and parallel to the clip center axis 52. In this example, the first flat surface 64 is interrupted by channels 66, 68. The channels 66, 68 interrupt the clip 38 along the rotation axis A, and increase the ease of engagement between the clip 38 and the horizontal portion 36 in the case of inconsistencies in either structure along the rotation axis A.

Moving from the first flat surface 64, the clip 38 transitions from to a rounded surface 70 (see FIGS. 2 and 3) that follows a constant radius relative to the axis A. At an underside of the clip 38, the rounded surface 70 transitions into a second flat surface 72 (perhaps best seen in FIGS. 2, 8A, and 8B). The second flat surface 72 lies in a plane substantially parallel to the plane of the first flat surface 64 and the clip center axis 52. The second flat surface 72 transitions to a second angled surface 74, which connects the second finger 56 and the second flat surface 72.

As perhaps best seen in FIG. 3, the rod 24 includes a first flat surface 76 on a forward and a topside of the horizontal portion 36. In this example, the first flat surface 76 lies on a first plane $P_1$, which extends in a direction substantially in-and-out of the page relative to FIG. 3. The rod 24 further includes a second flat surface 78, which lies on a second plane $P_2$, on an underside of the horizontal portion 36. Plane $P_2$ is substantially parallel to the axis A and perpendicular to the vertical axes $V_1$, $V_2$. That is, plane P2 intersects the vertical axes $V_1$, $V_2$ at substantially a ninety-degree angle. Plane $P_1$ is inclined relative to the plane $P_2$. In this example, plane $P_1$ is inclined in the forward direction (counterclockwise relative to FIG. 3) at angle within a range of 20-30 degrees.

As seen in FIG. 2, a rearward side of the horizontal portion 36 may include a pin 80 configured to engage a slot (see the slot 90 in FIGS. 8A-8B) formed at the rounded surface 70 of the clip 38. The slot 90 and the pin 80 restrict the rotation of the head restraint 22.

Figure 5:
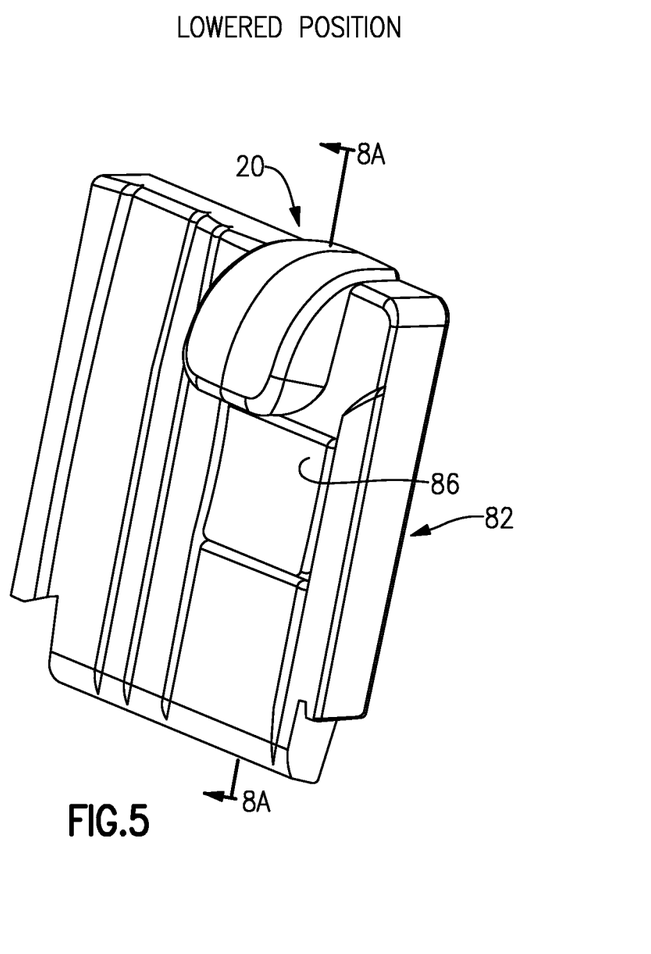
Figure 6A:
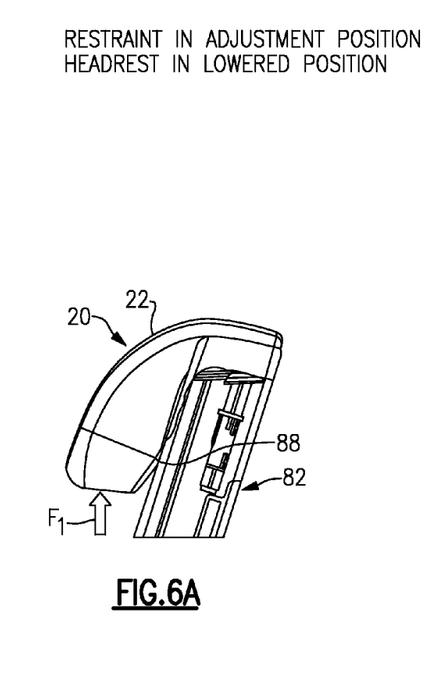
FIG. 6A is a side view of a headrest in the lowered position with a head restraint in an adjustment position.

FIG. 5 illustrates the headrest assembly 20 in a lowered position relative to a seatback 82. In this position, a lower portion of the head restraint 22 rests against a forward surface 86 of the seatback 82, as shown in FIG. 6A. In particular, as shown in FIG. 6A, a rear surface 88 of the lower portion of the head restraint 22 contacts the forward surface 86. In the lowered position, the head restraint 22 projects toward an occupant space. This is typically uncomfortable for a user. The headrest assembly 20 is typically in the lowered position when no occupant is seated in the seat.

Figure 6B:
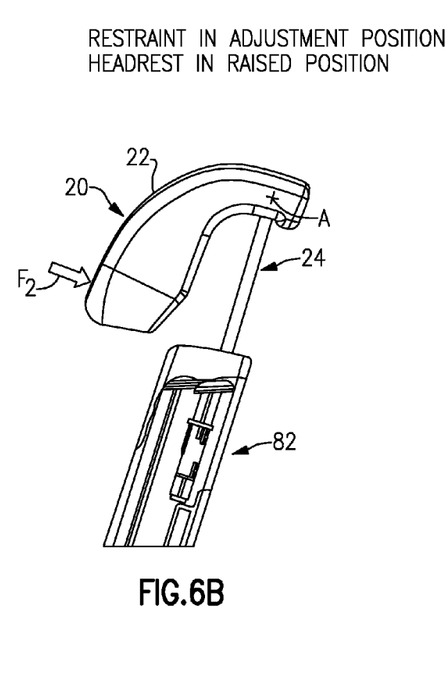
FIG. 6B is a side view of a headrest in a raised position with a head restraint in an adjustment position.
Figure 6C:
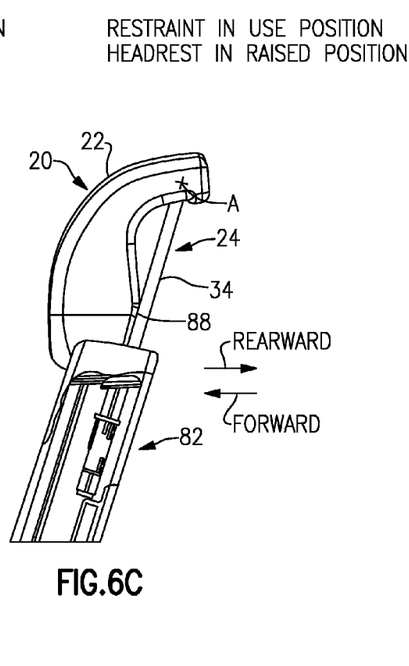
FIG. 6C is a side view of a headrest in a raised position with a head restraint in a use position.

FIGS. 6A-6C are side views of the headrest assembly 20, and illustrate movement of the headrest assembly 20 relative to the seatback 82 from the lowered position to a raised position. When in the raised position, the head restraint is rotatable about the axis A from an adjustment position to a use position.

In FIG. 6A, the head restraint 22 is in an adjustment position, with the rear surface 88 in contact with the forward surface 86, and the headrest assembly 20 is in the lower position of FIG. 5. To move the headrest assembly 20 from the lowered position of FIG. 6A to the raised position of FIG. 6B, a user applies an upward force $F_1$ to the head restraint 22. The upward force $F_1$ allows the rod 24 to move vertically relative to the corresponding coupling within the seatback 82.

Figure 7:
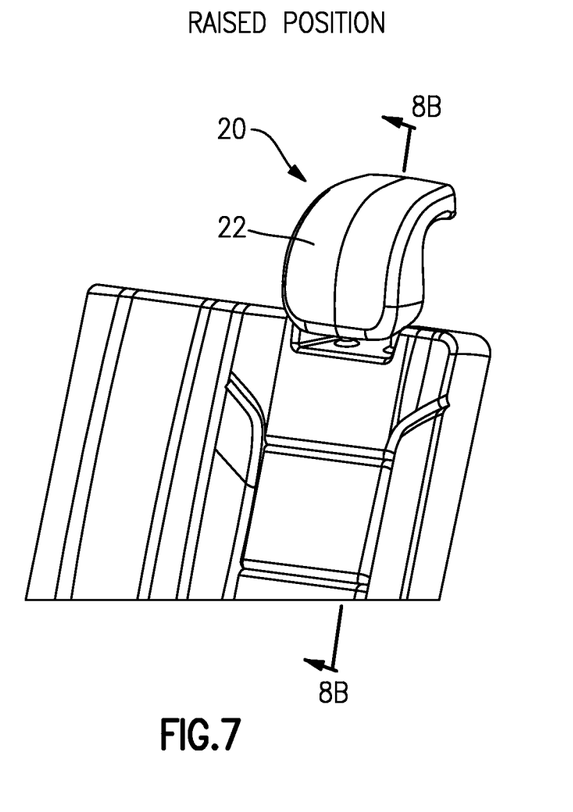

In FIG. 6B, the headrest assembly 20 has been moved to in the raised position. In this position, the head restraint 22 can then be rotated relative to the rod 24 about the axis A. To rotate the head restraint 22 from the adjustment position of FIG. 6B to the use position of FIG. 6C, a user applies a rearward force $F_2$ on the head restraint 22 to cause rotation about the axis A. In this example, when the head restraint 22 is in the use position, the rear surface 88 contacts the vertical portions 32, 34 of the rod 24 for increased safety and support. FIG. 7 is a perspective view illustrating the headrest assembly 20 in the raised position, with the head restraint 22 in the use position, as substantially shown in FIG. 6C.

Figure 8A:
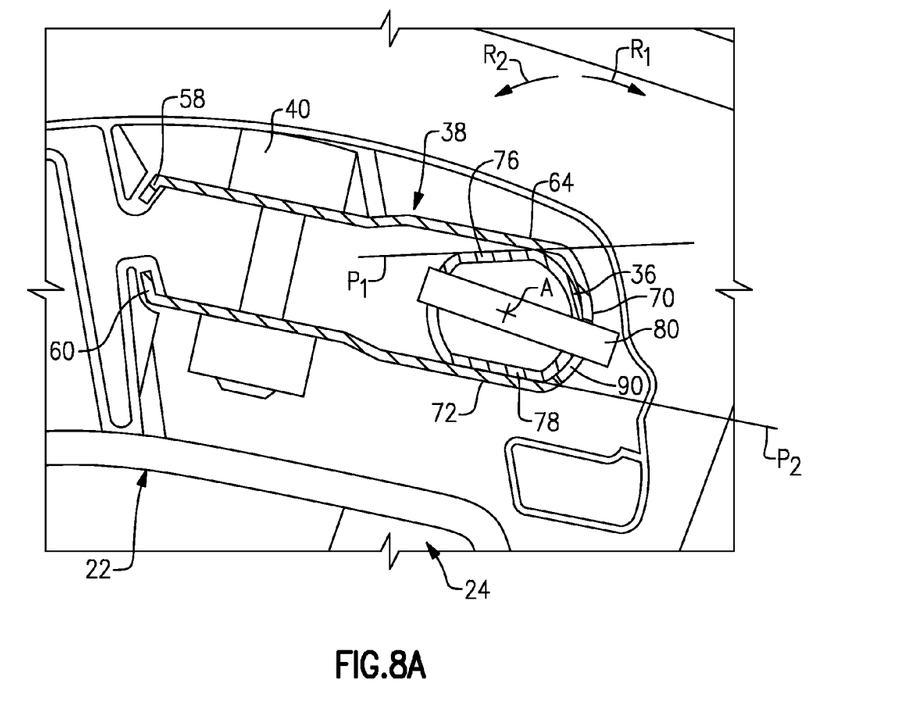
FIG. 8A is a close-up, cross-sectional view of the arrangement of the clip relative to the horizontal portion of the rod when the head restraint is in the adjustment position.
Figure 8B:
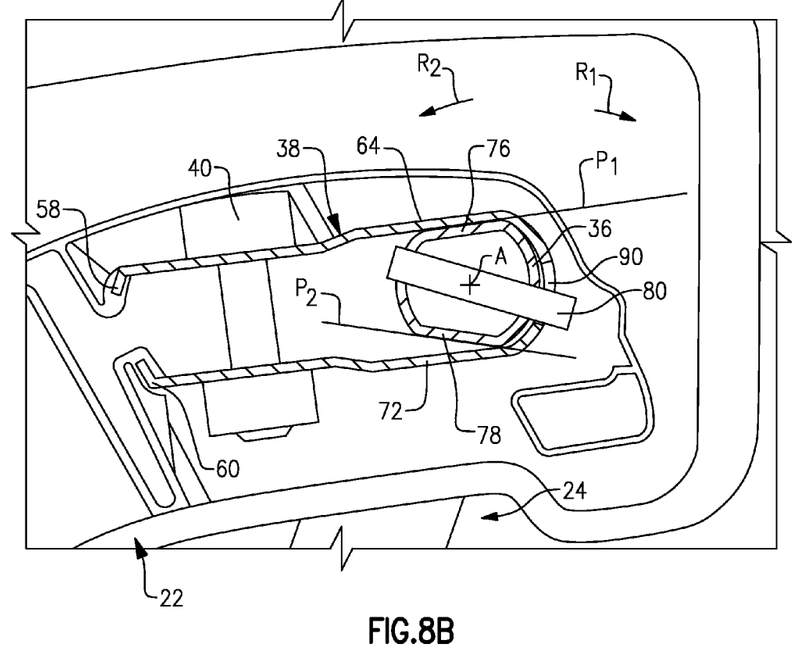
FIG. 8B is a close-up, cross-sectional view of the arrangement of the clip relative to the horizontal portion of the rod when the head restraint is in the use position.

FIGS. 8A-8B illustrate the manner in which the clip 38 interacts with the horizontal portion 36 of the rod 24 as the head restraint 22 rotates about the axis A. In FIG. 8A, the head restraint is in the adjustment position. In the adjustment position, the second flat surface 72 of the clip 38 is in direct contact with the second flat surface 78 of the horizontal portion 36, and the second flat surfaces 72, 78 lie in a common plane, which in this example is the second plane $P_2$. Further, in this position, the first flat surface 64 of the clip 38 is inclined relative to the first plane $P_1$ of the first flat surface 76 of the horizontal portion 36. That is, the first flat surfaces 64, 76 do not lie on a common plane.

As mentioned above, the pin 80 projecting from the horizontal portion 36 is moveable within a slot 90 in the rounded surface 70 of the clip 38. The head restraint 22 is prevented from further rotation in the rotational direction $R_1$ (which is clockwise, relative to FIG. 8A) by engagement between an end of the slot 90 and the pin 80.

In order to rotate the head restraint 22 to the use position, the head restraint 22 is rotated in the direction $R_2$ (which is counterclockwise, relative to FIG. 8A) under the force $F_2$ (FIG. 6B). FIG. 8B shows the head restraint 22 in the use position. In this position, the first flat surface 64 of the clip 38 is in direct contact with the first flat surface 76 of the horizontal portion 36. Further, the first flat surfaces 64, 76 lie in a common plane, which in this example is the plane $P_1$. When in the use position, the second flat surfaces 72, 78 are inclined relative to one another. Further, the pin 80 prevents further rotation of the head restraint in the rotational direction $R_2$ by contact with another end of the slot 90.

The arrangement of the clip 38 and the horizontal portion 36 reliably maintains the head restraint 22 in a desired position (e.g., either the adjustment position or the use position). For instance, to move the head restraint 22 from the adjustment position to the use position, the force $F_2$ must overcome the resilience of the clip 38 to move the second flat surface 72 off of the second plane $P_2$. When in the use position, the clip 38 gives the user a sensation of a "snap," as the head restraint moves into the use position. The disclosed arrangement prevents unintentional movement of the head restraint 22 away from the use position, which increases safety, comfort, and reliability.

Further, a user must apply a similar force in an opposite direction to move the first flat surface 64 of the clip off of the first plane $P_1$. When moving back to the adjustment position, the clip 38 again provides the user with a "snap" sensation. Because of the disclosed arrangement, the head restraint will remain in the adjustment position without further application of force by the user, which is particularly useful with raising and lowering the headrest assembly 20. In other words, a user does not continually have to overcome the bias of a spring toward the use position when attempting to raise and lower the headrest assembly 20.

It should be understood that terms such as "forward," "rearward," "topside," and "downside" are used above with reference to the normal operational attitude of a seat within a motor vehicle. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
   a rod configured to connect the headrest assembly to a seat back, the rod including two vertical portions and a horizontal portion extending along a rotation axis between the two vertical portions, the horizontal portion including a first flat surface and a second flat surface;
   a head restraint configured to rotate relative to the rod between a use position and an adjustment position;
   a clip rotatably connecting the head restraint to the rod, the clip having a first flat surface and a second flat surface; and
   wherein the clip is configured such that (1) when the head restraint is in the use position, the first flat surface of the clip is in direct contact with the first flat surface of the horizontal portion and the first flat surfaces of the clip and the horizontal portion lie in a first common plane, and (2) when the head restraint is in the adjustment position, the second flat surface of the clip is in direct contact with the second flat surface of the horizontal portion and the second flat surfaces of the clip and the horizontal portion lie in a second common plane.

2. The headrest assembly as recited in claim 1, wherein the first flat surface of the clip lies in a plane parallel to a plane of the second flat surface of the clip.

3. The headrest assembly as recited in claim 1, wherein the clip is substantially U-shaped and includes a bearing portion and a connection portion, wherein the bearing portion is disposed about the horizontal portion of the rod and includes the first and second flat surfaces of the clip.

4. The headrest assembly as recited in claim 3, wherein the connection portion includes first and second fingers fastened to a frame of the head restraint by at least one fastener.

5. The headrest assembly as recited in claim 4, wherein the frame supports a cushion of the head restraint.

6. The headrest assembly as recited in claim 1, wherein the second common plane is substantially perpendicular to the vertical portions of the rod.

7. The headrest assembly as recited in claim 6, wherein the second flat surface of the horizontal portion is provided on an underside of the horizontal portion.

8. The headrest assembly as recited in claim 6, wherein the first common plane is inclined relative to the second common plane.

9. The headrest assembly as recited in claim 8, wherein the first common plane is inclined in a forward direction at an angle within a range of 20 to 30 degrees relative to the second common plane.

10. The headrest assembly as recited in claim 8, wherein the first flat surface of the horizontal portion is on a forward side of the rod and faces an occupant space.

11. A seat for a motor vehicle, comprising:
    a seat back;
    a headrest assembly, comprising:
      a rod connecting the headrest assembly to the seat back, the rod including two vertical portions and a horizontal portion extending along a rotation axis between the two vertical portions, the horizontal portion including a first flat surface and a second flat surface;
      a head restraint configured to rotate relative to the rod between a use position and an adjustment position;
      a clip rotatably connecting the head restraint to the rod, the clip having a first flat surface and a second flat surface; and
      wherein the clip is configured such that (1) when the head restraint is in the use position, the first flat surface of the clip is in direct contact with the first flat surface of the horizontal portion and the first flat surfaces of the clip and the horizontal portion lie in a first common plane, and (2) when the head restraint is in the adjustment position, the second flat surface of the clip is in direct contact with the second flat surface of the horizontal portion and the second flat surfaces of the clip and the horizontal portion lie in a second common plane.

12. The seat as recited in claim 11, wherein the first flat surface of the clip lies in a plane parallel to a plane of the second flat surface of the clip.

13. The seat as recited in claim 11, wherein the clip is substantially U-shaped and includes a bearing portion and a connection portion, wherein the bearing portion is disposed about the horizontal portion of the rod and includes the first and second flat surfaces of the clip.

14. The seat as recited in claim 13, wherein the connection portion includes first and second fingers fastened to a frame of the head restraint by at least one fastener extending through each of the first and second fingers.

15. The seat as recited in claim 14, wherein the frame supports a cushion of the head restraint.

16. The seat as recited in claim 11, wherein the second common plane is substantially perpendicular to the vertical portions of the rod.

17. The seat as recited in claim 16, wherein the second flat surface of the horizontal portion is provided on an underside of the horizontal portion.

18. The seat as recited in claim 16, wherein the first common plane is inclined relative to the second common plane.

19. The seat as recited in claim 18, wherein the first common plane is inclined in a forward direction at an angle within a range of 20 to 30 degrees relative to the second common plane.

20. The seat as recited in claim 18, wherein the first flat surface of the horizontal portion is on a forward side of the rod and faces an occupant space.

* * * * *